Aug. 12, 1958 C. F. ALTHOUSE 2,847,661

RECTANGULAR COORDINATE POINT DATA DISPLAY

Filed Sept. 28, 1953 10 Sheets-Sheet 1

INVENTOR.
CHARLES F. ALTHOUSE

BY George Sipkin
George E. Pearson
ATTORNEYS

RECTANGULAR COORDINATE POINT DATA DISPLAY

Filed Sept. 28, 1953 10 Sheets-Sheet 2

INVENTOR.
CHARLES F. ALTHOUSE
BY George Sipkin
George E. Pearson
ATTORNEYS

RECTANGULAR COORDINATE POINT DATA DISPLAY

Filed Sept. 28, 1953 10 Sheets-Sheet 3

INVENTOR.
CHARLES F. ALTHOUSE
BY George Sipkin
George E. Pearson
ATTORNEYS

RECTANGULAR COORDINATE POINT DATA DISPLAY

Filed Sept. 28, 1953

10 Sheets-Sheet 4

INVENTOR.
CHARLES F. ALTHOUSE
BY George Lipkin
George E. Pearson
ATTORNEYS

RECTANGULAR COORDINATE POINT DATA DISPLAY

Filed Sept. 28, 1953 10 Sheets-Sheet 5

INVENTOR.
CHARLES F. ALTHOUSE
BY George Lipkin
George E. Pearson
ATTORNEYS

INVENTOR.
CHARLES F. ALTHOUSE
BY George Lipkin
George E. Pearson
ATTORNEYS

RECTANGULAR COORDINATE POINT DATA DISPLAY

Filed Sept. 28, 1953 10 Sheets-Sheet 7

INVENTOR.
CHARLES F. ALTHOUSE
BY George Lipkin
George E. Pearson
ATTORNEYS

Aug. 12, 1958 C. F. ALTHOUSE 2,847,661

RECTANGULAR COORDINATE POINT DATA DISPLAY

Filed Sept. 28, 1953 10 Sheets-Sheet 8

INVENTOR.
CHARLES F. ALTHOUSE

BY George Sipkin
George E. Pearson
ATTORNEYS

RECTANGULAR COORDINATE POINT DATA DISPLAY

Filed Sept. 28, 1953 10 Sheets-Sheet 9

INVENTOR.
CHARLES F. ALTHOUSE
BY George Sipkin
George E. Pearson
ATTORNEYS

INVENTOR.
CHARLES F. ALTHOUSE
BY George Sipkin
George E. Pearson
ATTORNEYS

United States Patent Office
2,847,661
Patented Aug. 12, 1958

2,847,661

RECTANGULAR COORDINATE POINT DATA DISPLAY

Charles F. Althouse, San Diego, Calif.

Application September 28, 1953, Serial No. 382,881

14 Claims. (Cl. 340—212)

(Granted under Title 35, U. S. Code (1952), sec. 266)

The invention described herein may be manufactured and used by or for the Government of the United States of America for governmental purposes without the payment of any royalties thereon or therefor.

This invention relates generally to data transmission and receiving systems and more particularly to a system of this type wherein raster scan techniques are utilized to display a large number of position coordinate data points corresponding to target positions, or the like, on a single display surface.

In such a system, for example, a pair of shafts linked to a data gathering source such as radar or sonar may be caused to assume positions respectively denoting rectangular coordinates which indicate the position of a target, one such pair of shafts being employed for each of several targets. The pairs of shafts thus control the position coordinate data points which are desired to be displayed upon a rectangular surface.

Various methods and arrangements have been proposed and devised heretofore to provide data displays on cathode ray tubes. While luminescent spots can be located and moved over the face of the display tube, the means for accomplishing this becomes quite complex when a number of spots are required. One such means heretofore employed utilizes a sequence type of scanning technique wherein a switch, mechanical or electrical, samples electrical rectangular coordinate data on pairs of contacts and the output of the switch is applied by way of deflection amplifiers to the deflection plates of the cathode ray tube whereby the beam of the tube is deflected in an amount proportional to the switch output. Intensity modulation of the beam causes a spot to appear on the face of the tube during the "dwell" time of the switch contacts.

This prior art display affords the required degree of flexibility but becomes quite complex once the number of spots required exceeds approximately six spots. Moreover, other problems incident to this arrangement such, for example, as D. C. amplifier drift and non-linearity of electrostatic cathode ray tubes are difficult to overcome.

According to the method and arrangement of the present invention, a data display system utilizing raster scan as used by the television industry is employed wherein the input information, insofar as the production of luminescent spots is concerned, is basically in rectangular coordinates and the cathode ray tube display is thus rendered capable of displaying a large number of spots, the limit being as many spots as is required to completely fill the display area of the tube for a given spot size. Practical considerations, however, limit the maximum number of spots which may be effectively used to that number from which usable data can be derived from the display.

The data display method and system of the present invention has the additional advantage in that background or fixed information such, for example, as map or chart information, can be introduced by means of well known television slide projection techniques and displayed with the spots. This system and method has the further advantage in that the raster scan data, once generated, is in basically the same form as a commercial television video signal and can therefore be transmitted, as in the case of television, over wireless links. The raster scanning technique for position coordinate data display may thus be used to tremendous advantage, for example, for rapid coordination of information from several geographical points.

The foregoing and other advantages and features of the present invention are accomplished by means, hereinafter more fully to be described as the specification proceeds, wherein a synchronization generator produces harmonically related pulses which, in turn, produce the sawtooth deflection of the beam of the cathode ray tube both horizontally and vertically, thereby generating the raster. The synchronization generator is also utilized to operate two four-phase generators the outputs of which are fed respectively to a pair of potentiometer type phase shift devices. The shaft positions of the potentiometers and thus the amount of phase shift introduced thereby, are determined by the $x$ and $y$ coordinates of a target such that delays proportional to these coordinates are introduced into the outputs of the phase shift devices. From the phase shifted, and thus delayed potentiometer outputs there are produced pulses which are applied to a coincidence circuit, and the output of this circuit is shaped and applied to the grid of the cathode ray tube to intensity modulate the beam and thus produce a spot on the screen of the tube in a position thereon corresponding to the aforesaid $x$ and $y$ coordinates of the target.

An object of the present invention therefore is to provide a new and improved method and system for the display of position coordinate data points or spots.

Another object resides in the provision of a method and system of this character which utilizes raster scanning techniques for the production of a large number of such spots on a single display area.

Another object is to provide a new and improved cathode ray tube data display system which utilizes raster scanning techniques for the display of a large number of position coordinate data points on the face of the cathode ray tube.

Another object is to provide a raster scan type data display system in which fixed background information may be displayed with the coordinate data spots.

A further object is to provide a raster scan type data display system in which the raster scan data generated therein may be transmitted over wireless links.

A still further object is to provide a method and system of coordinate data point display in which a raster is developed from mutually orthogonal and harmonically related time bases and in which time delays, generated from the reference points corresponding respectively to the initiation of the time bases, are employed to develop the data points in the raster.

Other objects and many of the attendant advantages of this invention will be readily appreciated as the same becomes better understood by reference to the following detailed description when considered in connection with the accompanying drawings wherein.

Figure 5A:
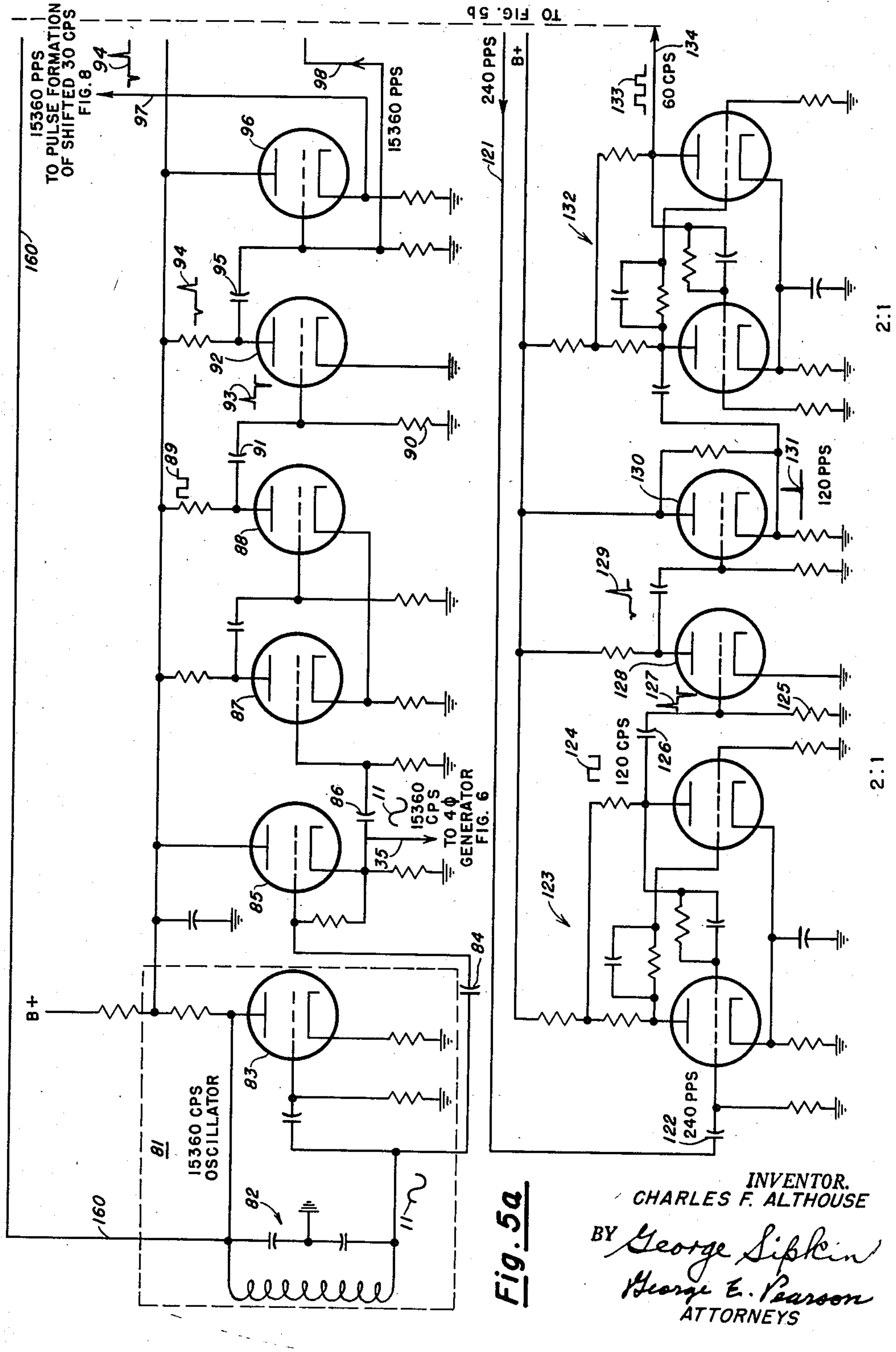
Figure 5B:
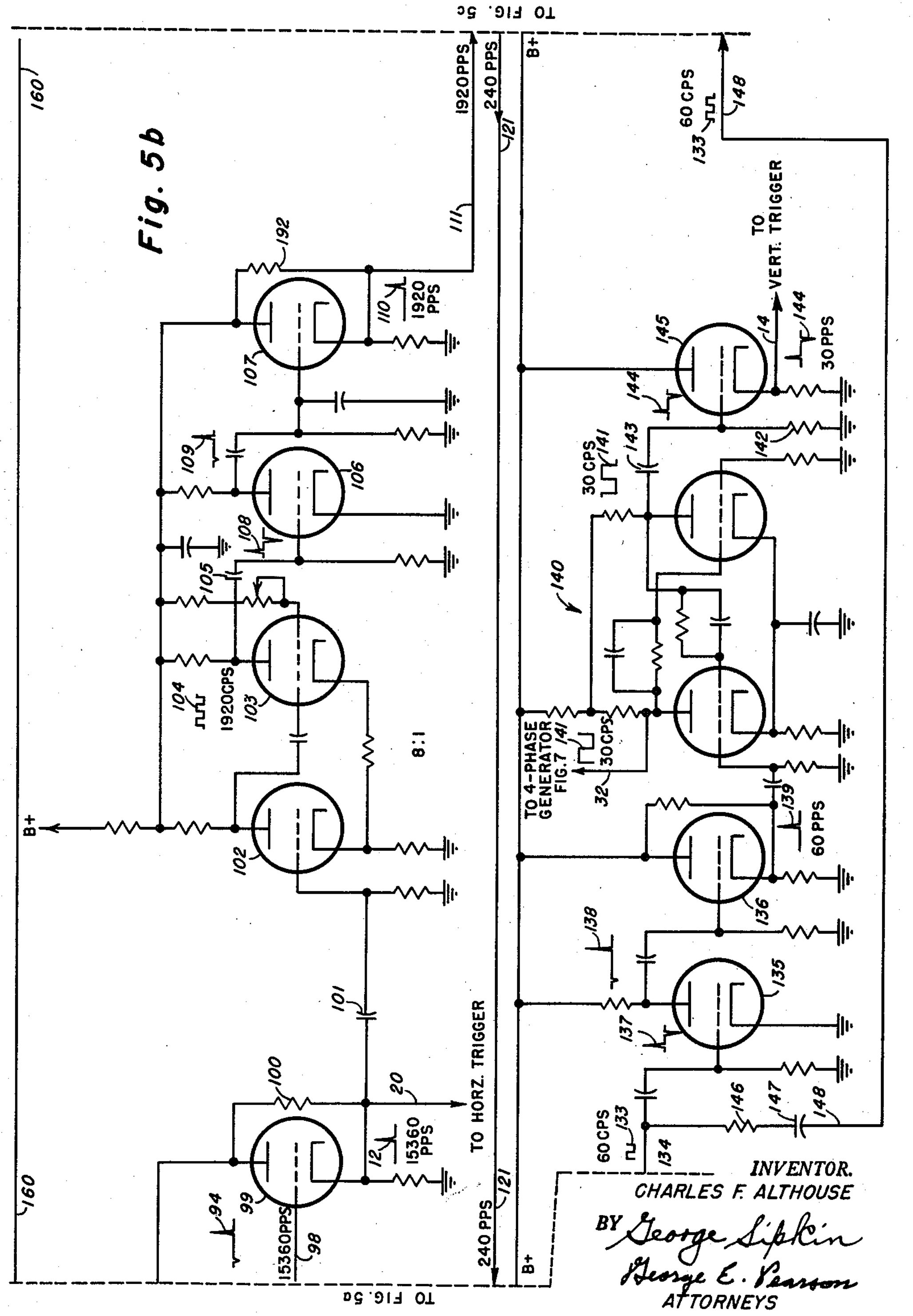
Figure 5C:
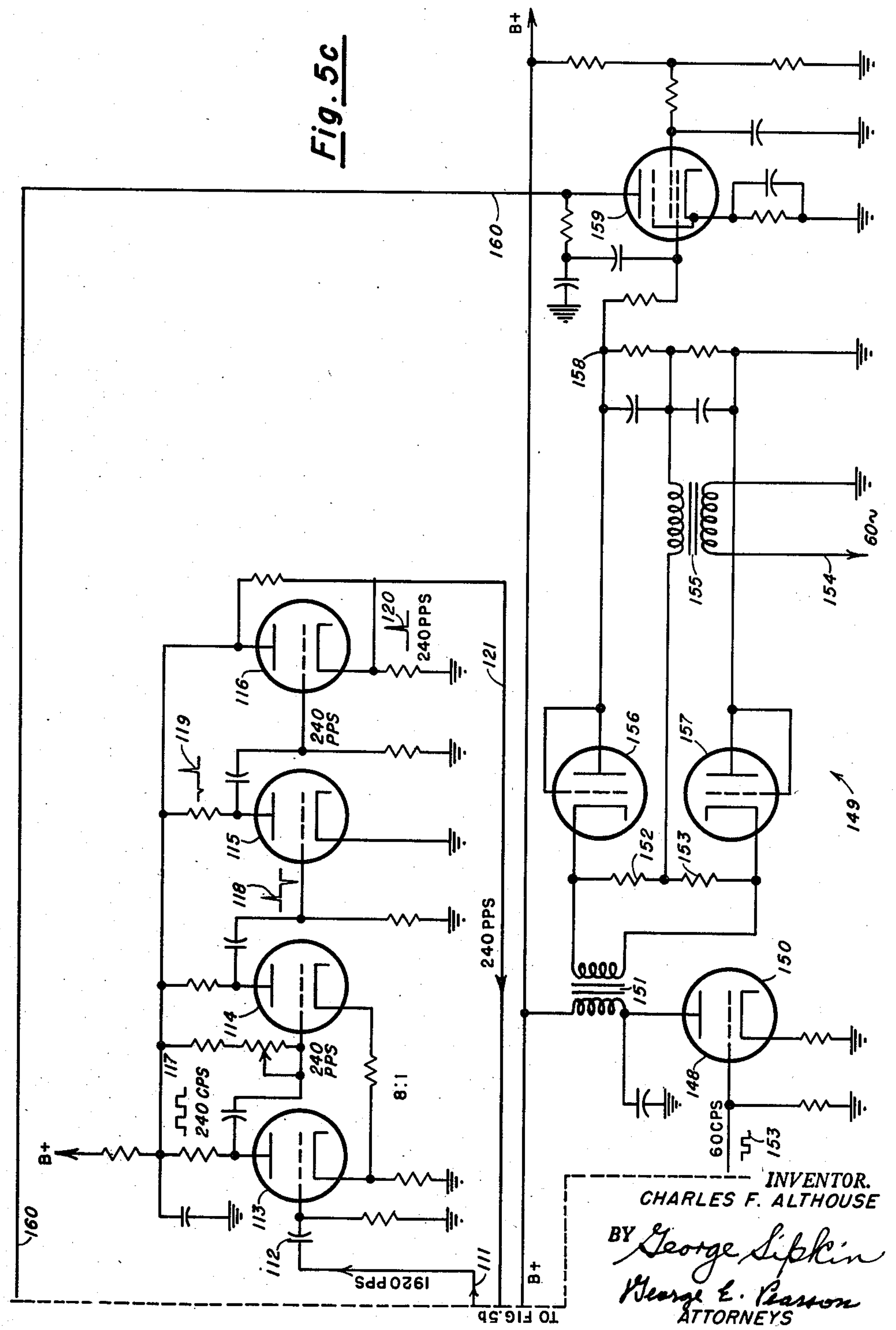
Figure 6:
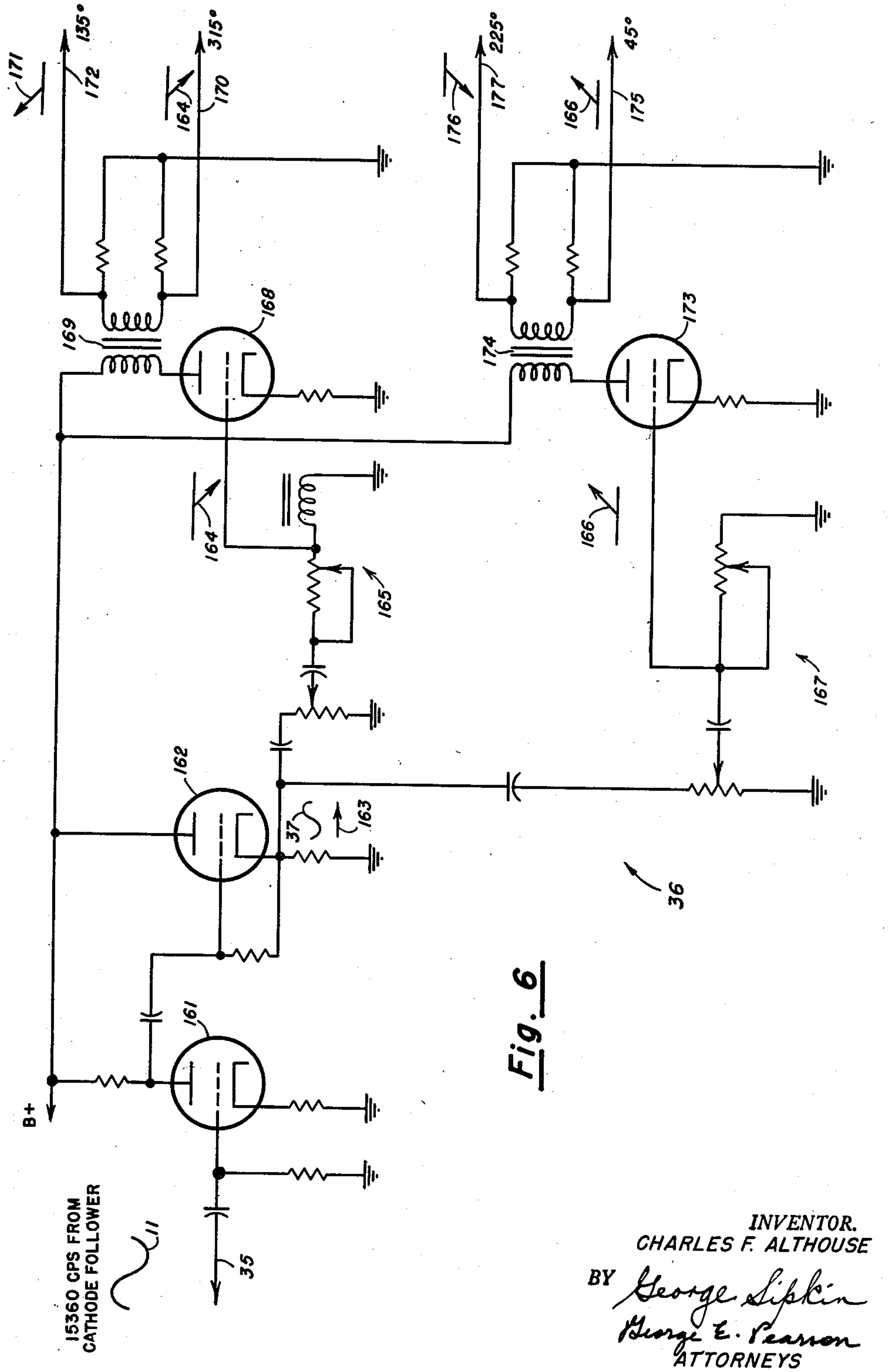
Figure 7:
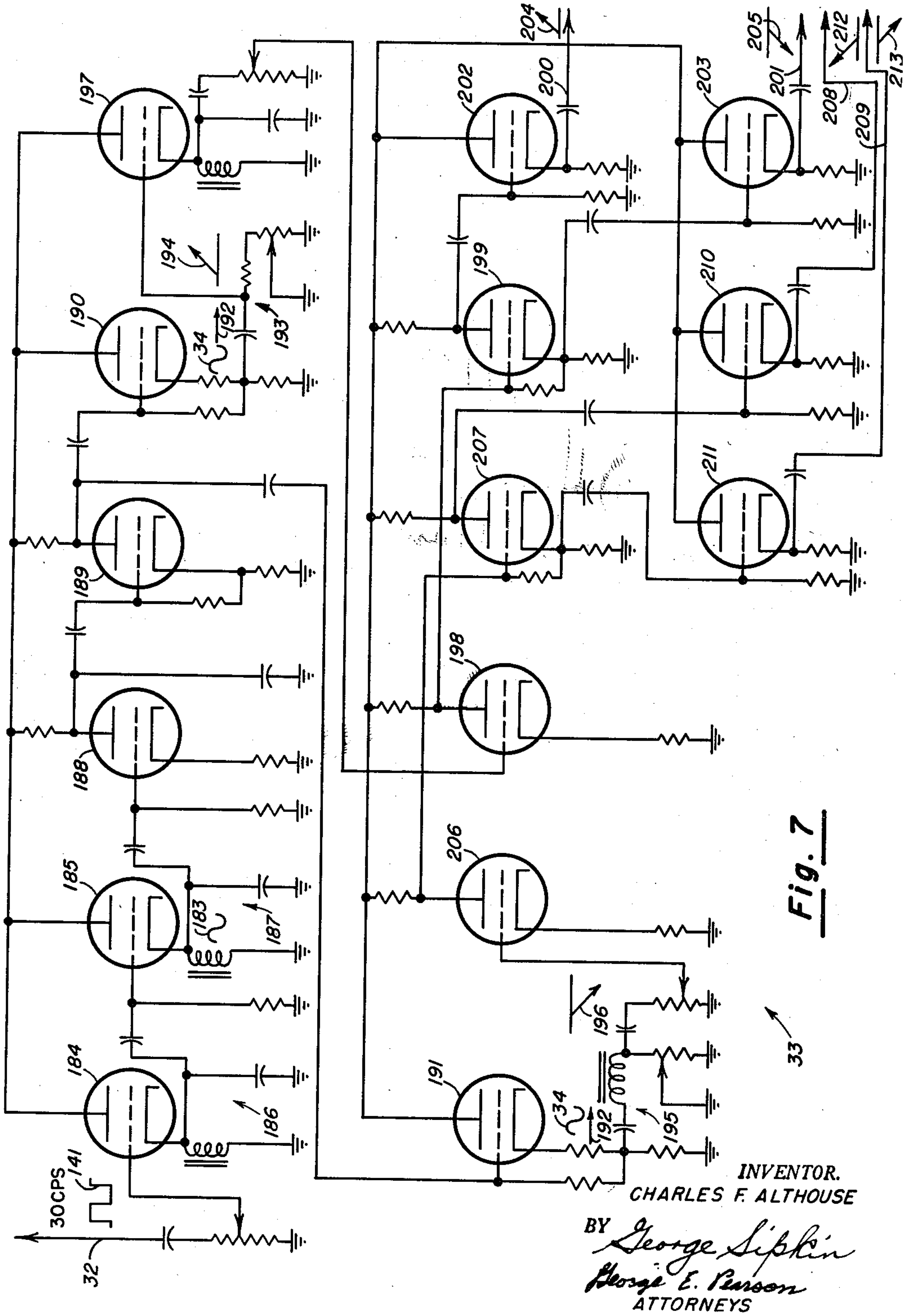
Figure 8:
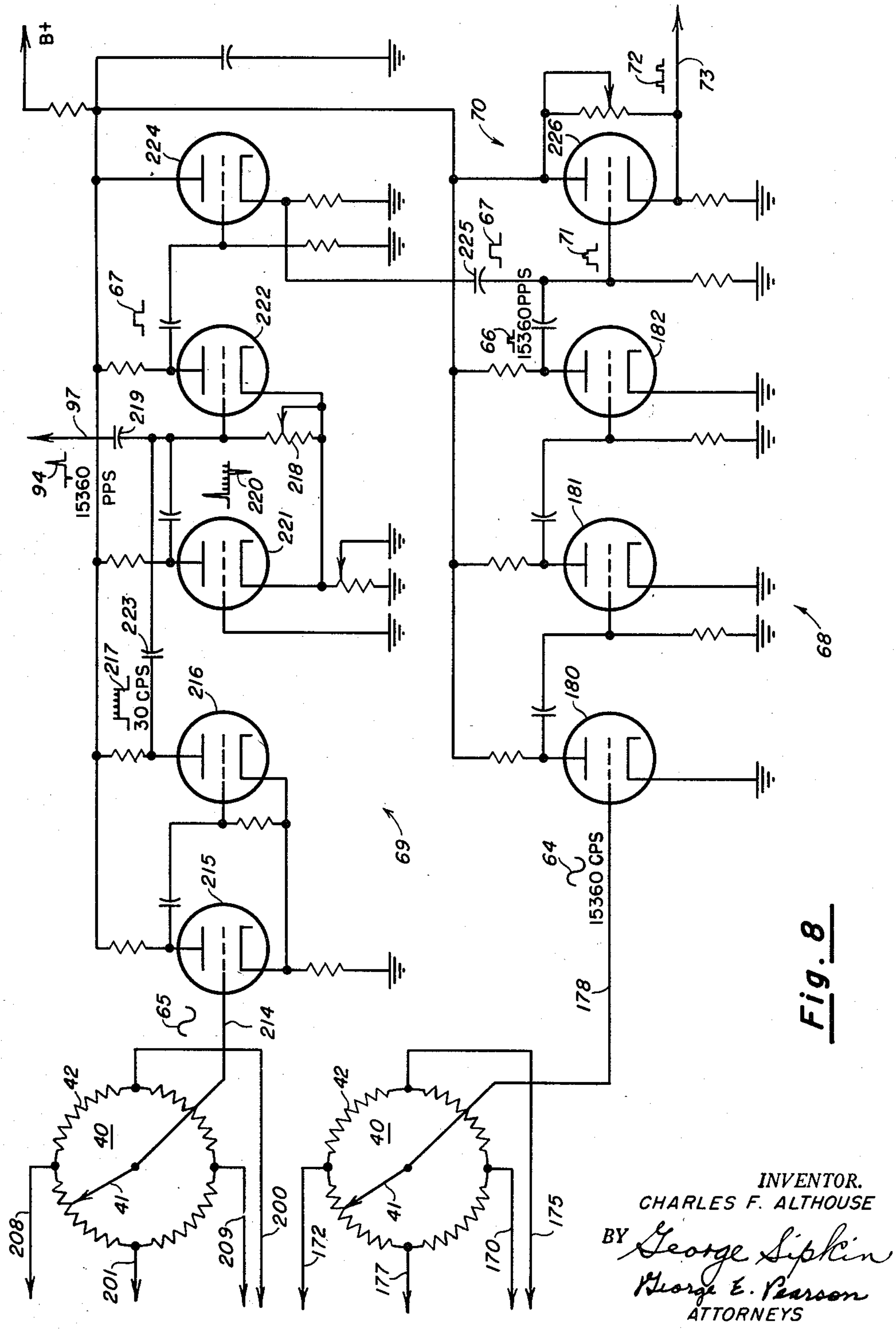
Figure 9:
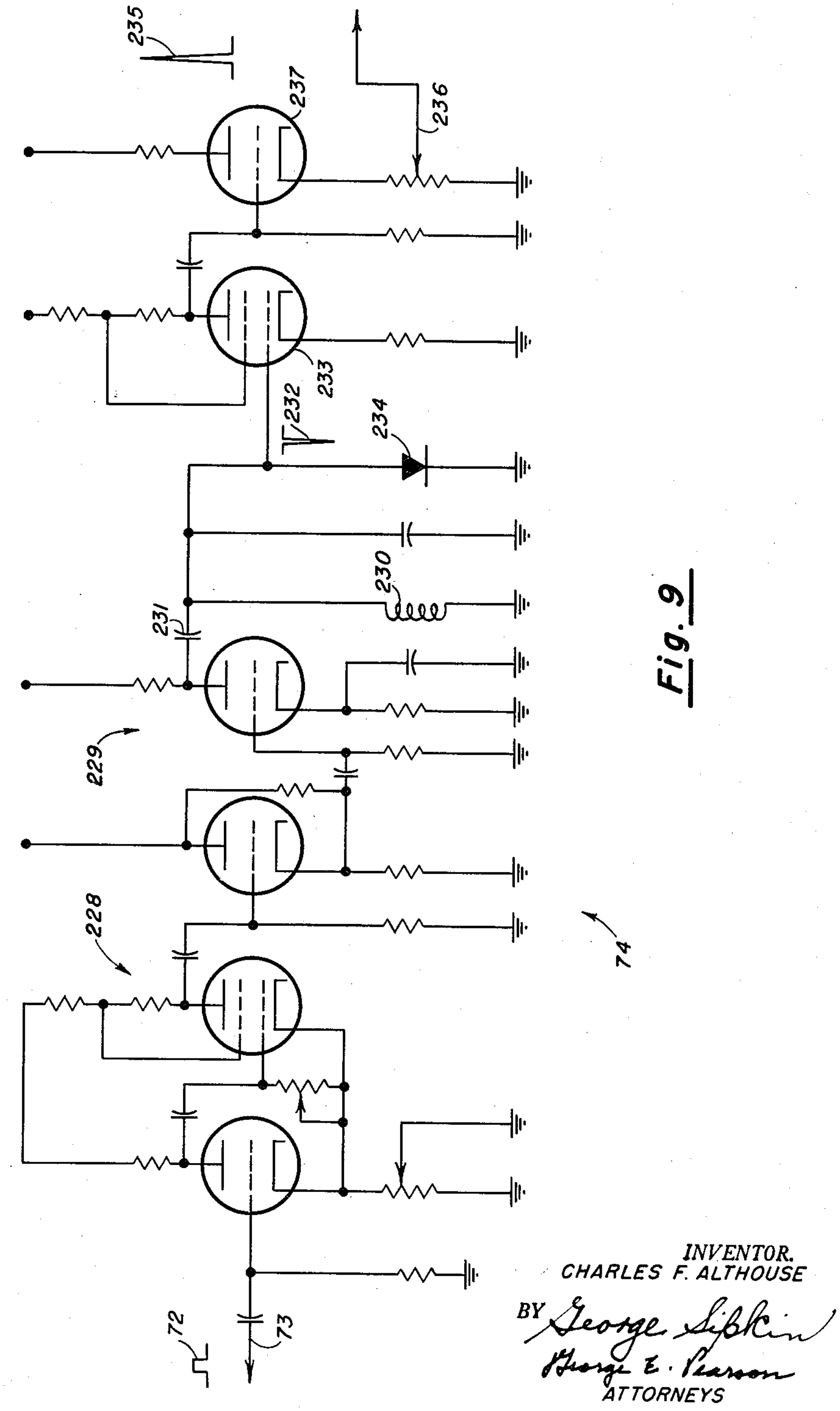

Figs. 5*a*, 5*b*, and 5*c* illustrate in diagrammatic form the complete electrical system of the synchronization generator;

Fig. 6 is an electrical schematic of the 15,360 C. P. S. 4-phase generator;

Fig. 7 is an electrical schematic of the 30 C. P. S. 4-phase generator;

Fig. 8 is an electrical schematic of the pulse formation and coincidence circuits; and Fig. 9 is an electrical schematic of the fast pulse shaping circuit.

Referring now to the drawings for a more complete understanding of the invention, the numeral 10 designates a synchronization generator of suitable conventional design capable of producing pulses which are harmonically related such, for example, as 15,360 pulses per second and 30 pulses per second. The 15,360 pulses per second, for example, may be derived from an oscillator such as generally designated 81, Fig. 5*a*, operating at 15,360 cycles per second and, by division of this frequency by a factor of 512, the 30 pulses per second may be derived therefrom by techniques well known to those skilled in the art. When necessary, the entire system can be made electrically stable by extensive use of bi-stable Eccles-Jordan circuit elements, this also being accomplished in accordance with well known methods.

The basic 15,360 C. P. S. sine wave produced by oscillator 81 is shown at 11 in Fig. 2. Also depicted in this figure are the 15,360 P. P. S. waveform designated 12 and the 30 P. P. S. waveform designated 13.

The 30 P. P. S. pulses from generator 10 are applied via conductor 14 to the "Y" sawtooth generator and deflection amplifier 15 from which is produced the "Y" sawtooth 16, Fig. 2, which is applied via conductor 17 to the vertical deflecting plates 18 of cathode ray tube 19, all in a well known manner. Similarly, the 15,360 pulses are applied via conductor 20 to the "X" sawtooth generator and deflection amplifier 21 from which is produced the "X" sawtooth 22, Fig. 2, which is applied via conductor 23 to the horizontal deflecting plates 24 of the cathode ray tube. As a result of these mutually orthogonal and harmonically related time bases thus applied to tube 19, the electron beam of the tube is swept across the face of the tube in a series of horizontal lines which, for the specific values assigned supra, provide a 512 line raster. Otherwise expressed, there is thus provided a field or frame rate of 512 lines per each vertical repetition period.

For the foregoing purpose, the cathode ray tube is of suitable conventional design comprising, in addition to the deflection plates 18 and 24, anodes 25 and 26, focusing electrode 27, control grid 28, and cathode 29. The electron beam 30 produces a spot of light on the face or screen 31 of the tube which, when momentarily intensity modulated by signals applied to the control grid 28 in the manner to be described infra, so increases the intensity of the light spot when the beam has been swept to a position on the face of the tube corresponding to the *x, y* coordinates of a target, as to clearly depict this coordinate position of the spot on the tube face.

The 30 P. P. S. pulses from the synchronization generator 10 are also applied via conductor 32 to a 4-phase generator 33 which produces in response thereto a four phase output, the basic sine waveform of which is shown at 34 in Fig. 2. Similarly, the 15,360 C. P. S. output of oscillator 81 of synchronization generator 10 is applied via conductor 35 to the 4-phase generator 36 from which, in response thereto, there is produced a four phase output the basic waveform of which is depicted at 37 in Fig. 2.

Figure 1:
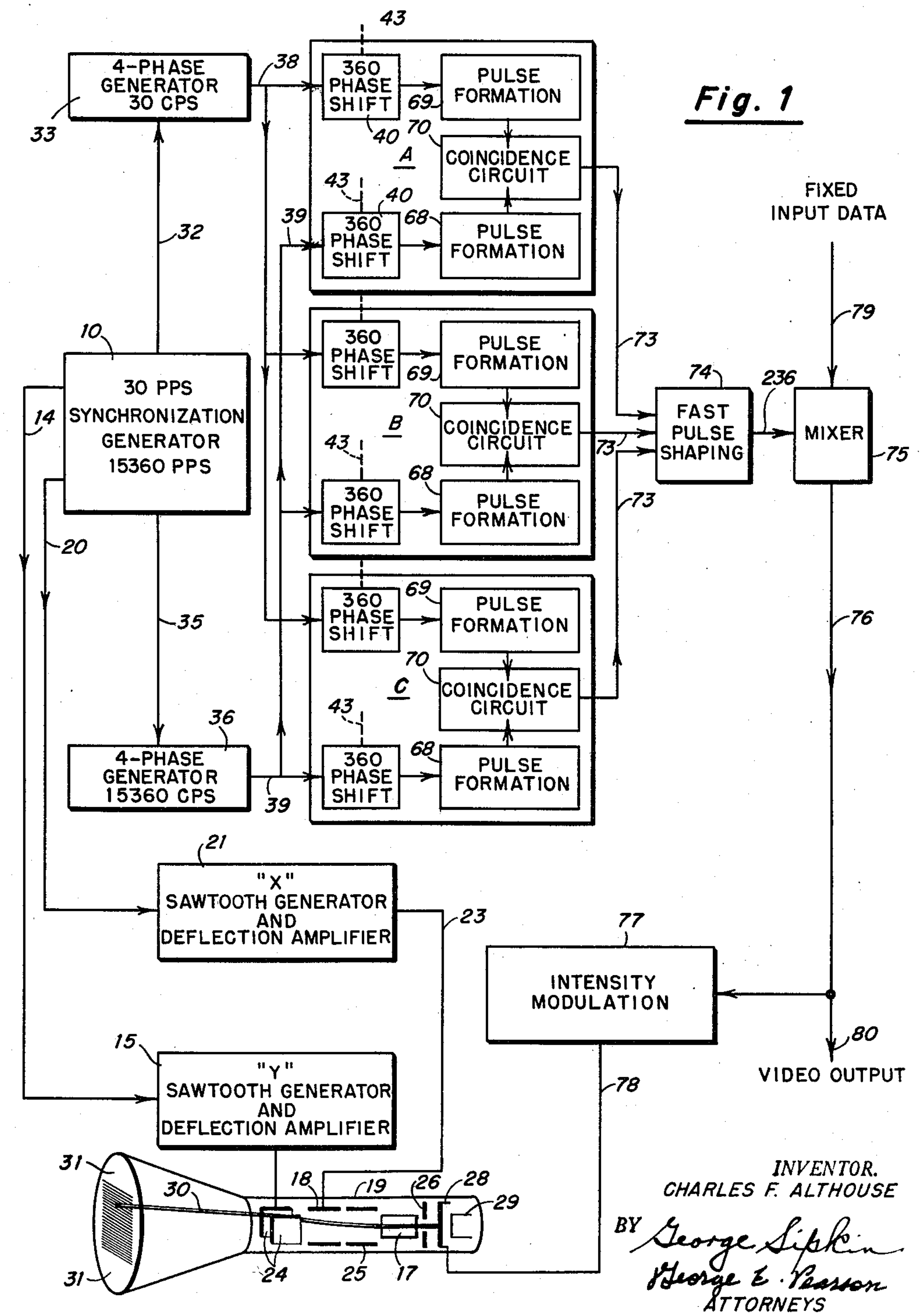
Fig. 1 is a diagrammatic view in block diagram form of the complete electrical system of the position coordinate data display of the present invention.

The four phase outputs of generators 33 and 36 are applied respectively by way of multi-conductors generally designated 38 and 39 to each of a plurality of phase shift delay units of which there is one unit for each target whose position is to be displayed on the face of the cathode ray tube, there being three such units shown in Fig. 1 and designated A, B and C therein.

Each of the delay units comprises a pair of 360° phase shift devices 40 each of which is capable of 360 degrees phase shift input to output thereof. Each device 40 preferably is in the form of a potentiometer comprising a wiper 41, Fig. 8, which sweeps over a circularly arranged resistance winding 42 having four equi-spaced taps to which the four output leads of the 4-phase generators, in each case, are respectively connected. Each wiper 41 is driven by a shaft 43 in the usual manner.

Figures 3, 4:
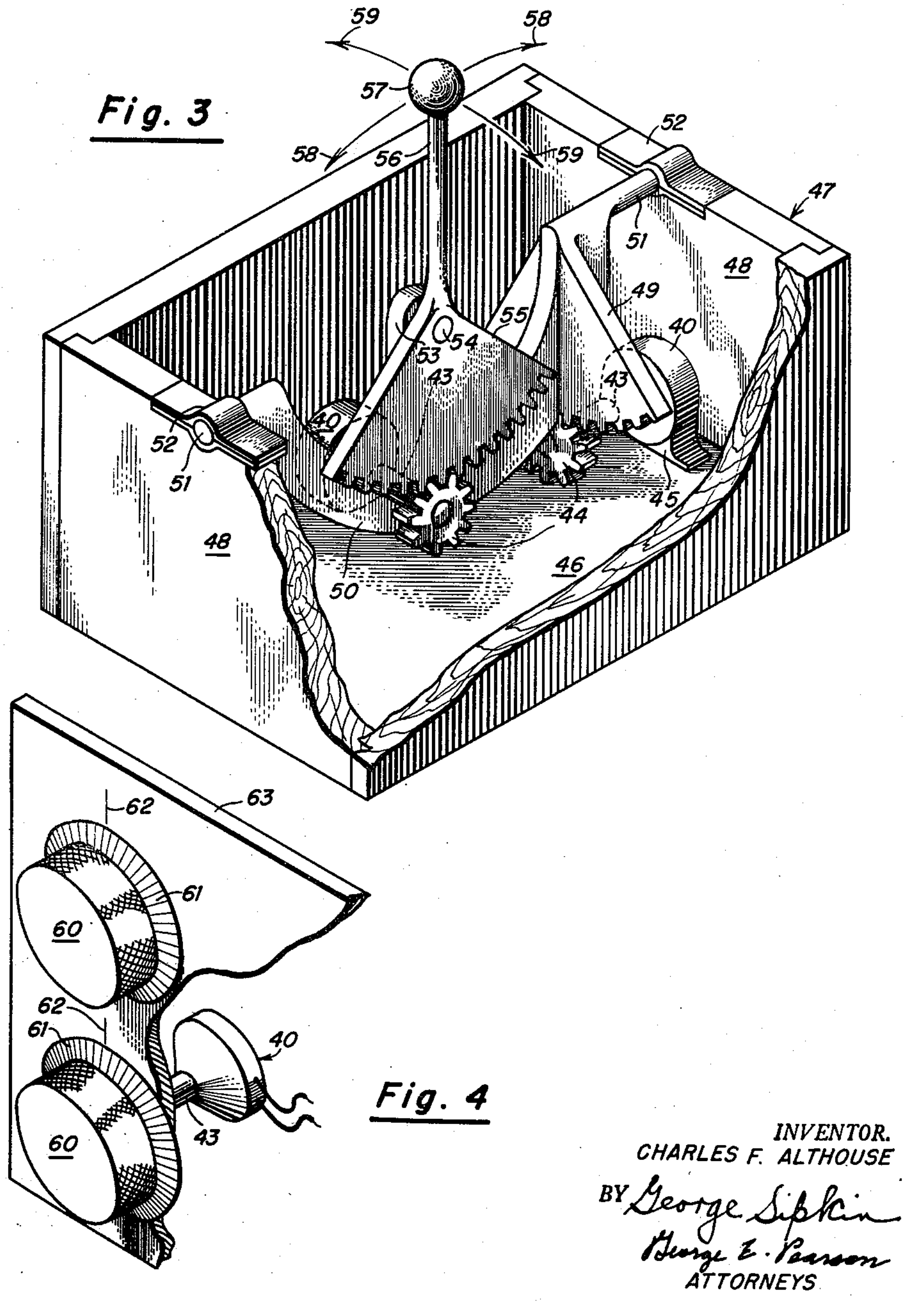
Fig. 3 is a view in perspective of a mechanical device for simulating target positions.
Fig. 4 is a view in perspective of an arrangement for providing individual adjustment of the phase shifting potentiometers employed in the system of the present invention.

Referring to Fig. 3, it will be seen that each potentiometer shaft 43 carries a pinion 44 and the shafts are arranged at right angles with respect to each other. One of the devices 40 is supported at 45 on the bottom member 46 of a box structure generally designated 47, the axis of shaft 43 of this device being perpendicular to the end plates 48 of the box. A gear segment 49 meshes with pinion 44 of this device 40 and forms a part of a generally semi-circular member 50 which is terminated with diametrically opposed shafted portions 51 which are journalled in bearings 52 secured to the end plates, as shown.

The other of devices 40 is carried by member 50 and the shaft 43 of this device is free to rotate with respect to member 50. Member 50 has a radially disposed arm 53 upon which is journalled a shaft 54 which, in turn, carries a gear segment 55. Gear segment 55 meshes with the pinion 44 on the last mentioned device 40 and has secured thereto an extended arm 56 which terminates in a ball or handle portion 57.

When ball 57 is tilted in the direction of either of arrows 58, gear segment 55 is pivoted about the axis of shaft 54 and the pinion 44 meshed therewith is rotated to adjust the wiper of the associated device 40 to a position providing a phase shift proportional to the extent of tilt of the ball 57 along the arc 58—58, this, for example, corresponding to the *x* coordinate of a simulated target position.

When ball 57 is tilted in the direction of either of arrows 59, this movement is imparted to member 50 which is thus caused to pivot about the axis of shaft portions 51 whereupon gear segment 49 causes rotation of associated pinion 44 and adjustment of the wiper of the associated potentiometer device 40 to a position providing a phase shift proportional to the extent of tilt of the ball 57 along the arc 59—59, this, for example, corresponding to the *y* coordinate of the simulated target.

From the foregoing, it will be apparent that by means of the target position simulator of Fig. 3 there is provided a device wherein positions of the potentiometer devices 40 corresponding to specific *x, y* coordinates may be obtained by adjustment of the single member 57. In Fig. 4 there is shown separate adjusting means for the two potentiometer shafts 43, these being simply the usual knobs 60 which carry the graduated indicia marks 61 indicating the degree of rotation of the knobs in relation to the reference marks 62 carried on the panel 63.

From the foregoing it should now be apparent that the tapped potentiometers produce the required delays which are proportional to the mechanical position of their wiper arms. The linearity of the delays with respect to mechanical positions of the shafts becomes a function of the linearity of the potentiometers and of the accuracy of the waveforms of the generators. An error of the order of 1% exists due to the resistance method of phase shift.

Figure 2:
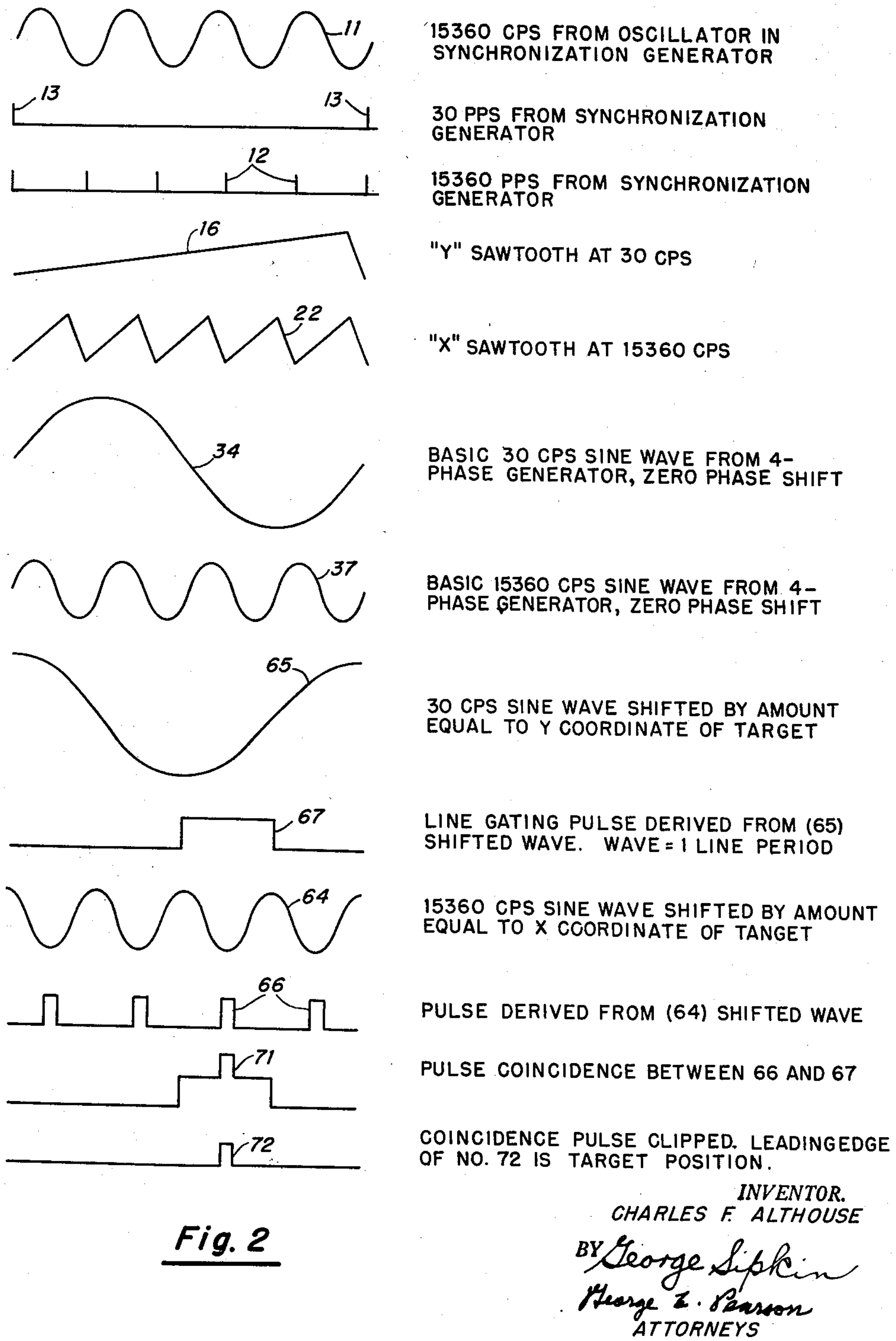
Fig. 2 is a graph depicting the waveforms of the pulses and signals employed in the data display method and system of the present invention.

The shifted output voltages corresponding to specific *x, y* values, for example, are disclosed at 64 and 65 respectively in Fig. 2 and are converted to pulses respectively depicted at 66 and 67 by the pulse formation networks 68 and 69 disclosed in block form in Fig. 1. The width of pulse 67 is made equal to one line period on the raster scan by specific circuit means hereinafter more fully to be disclosed.

The delayed pulses 66 and 67 are combined in a coincidence circuit 70 which, when both pulses are matched in phase, produces a combined output pulse depicted at 71 in Fig. 2. The combined pulse consists of a pulse 66 superimposed on a pulse 67 in the arrangement of a short pulse mounted on a pedestal comprising the pulse of longer duration. The combined pulse occurs only once during each vertical repetition period. The coincidence circuit also includes means for removing or clipping the pedestal with the result that the coincidence output pulse has the waveform depicted at 72.

The combined output or coincidence pulse 72 is applied by way of conducter 73 to the fast pulse shaping network 74 which narrows pulse 72 to the end that the pulse produces only momentary intensification of the beam 30 of the cathode ray tube 19 when the pulse is applied thereto via the mixer 75, conductor 76, the intensity modulation circuit 77, and conductor 78 to grid 28 of the tube.

The background or fixed input data is applied to the mixer by way of conductor 79, and the video output appearing at 80 is supplied for transmission to remote receiver stations when desired, in the manner of conventional television broadcasts.

Referring now to Figs. *5a*, *5b*, and *5c*, which discloses the circuitry for the synchronization generator 10, it will be seen that the same comprises an oscillator 81 including the usual tank circuit generally designated 82 and the triode 83 and its associated circuit elements. The oscillator output is applied via condenser 84 to the cathode follower circuit including triode 85 from the output of which at 35, the 15,360 C. P. S. is supplied to the 4-phase generator 36, Figs. 1 and 6.

The output of this cathode follower is also applied via condenser 86 to the regenerative squaring amplifier comprising tubes 87 and 88 and its associated circuit elements, the resulting alteration of the waveform 11 appearing at the plate of tube 88 as the square wave 89. This square wave is differentiated by RC circuit 90, 91 and appears at the grid of clipper tube 92 as indicated at 93, and tube 92 removes the positive pulse from wave form 93 with the result that the wave form at the plate of this tube appears as depicted at 94.

Pulse 94 is applied via condenser 95 to the cathode follower circuit including tube 96, the cathode follower serving to provide a suitable output as at 97 for the 15,360 P. P. S. supplied to the pulse formation circuit 69, Figs. 1 and 8, for the phase shifted 30 C. P. S. wave form 65.

Wave form 94 at 15,360 P. P. S. is also applied via conductor 98 to cathode follower tube 99 which includes the self bias resistor 100 for removing the negative pulse from wave form 94 with the result that the pulses 12 at 15,360 P. P. S. appear at the cathode of the tube and are supplied via conductor 20 to the "X" sawtooth generator and deflection amplifier 21, Fig. 1.

Wave form 12 is also applied via condenser 101 to the multivibrator comprising tubes 102 and 103, the RC values of the associated circuit elements being such that a frequency division of 8 to 1 occurs with the result that the output square wave 104 has a frequency of 1920 C. P. S. This square wave is differentiated by RC circuit including capacitor 105 and clipped by the circuits associated with tubes 106 and 107 which operate in the same manner as the circuits of tubes 92 and 99 to produce the wave forms 108, 109, and 110.

The waveform 110 at 1920 P. P. S. is applied via conductor 111 and condenser 112 to tubes 113, 114, 115, and 116 which together with their circuit elements perform the same functions as tubes 102, 103, 106, and 107 to provide the waveforms 117, 118, 119 and 120, the multivibrator 113, 114 providing a frequency division of 8 to 1 resulting in square wave 117 at 240 C. P. S. and the pulses 120 at 240 P. P. S.

The 240 P. P. S. are applied via conductor 121 and condenser 122, Fig. *5a*, to the Eccles-Jordan multivibrator generally designated 123 which produces the square wave 124 at 120 C. P. S., there being thus provided a frequency division of 2 to 1. Square wave 124 is differentiated by the RC network 125, 126 to provide the wave form 127 upon which tube 128 operates to remove the positive pulses with the resulting wave form 129 appearing at the plate of the tube. The remaining negative pulse is removed from wave form 129 by tube 130 to provide the wave form 131 at 120 P. P. S. In similar manner, multivibrator 132 converts the waveform 131 to the square wave 133 at 60 C. P. S. which is supplied via conductor 134 to tubes 135 and 136 which together with their associated circuit elements produce the waveforms 137, 138 and 139, the latter being at 60 P. P. S.

The waveform 139 at 60 P. P. S. is converted by the multivibrator 140 to the square wave 141 at 30 C. P. S. which is supplied via conductor 32 to the 4-phase generator 33, Figs. 1 and 7. Square wave 141 is differentiated by RC combination 142, 143 to produce the waveform 144 at 30 P. P. S. which is applied via the cathode follower tube to conductor 14, and thence to the "Y" sawtooth generator and deflection amplifier 15, Fig. 2.

Square wave 133 on conductor 134, Fig. *5b*, is applied by way of resistor 146, condenser 147, and conductor 148 to a phase detector, Fig. *5c*, generally designated 149, the square wave signal being applied via amplifier tube 150 and transformer 151 to resistors 152 and 153. A reference 60 C. P. S. voltage supplied as at 154 from a conventional source, not shown, is also applied to resistors 152 and 153 by way of transformer 155 and rectifier tubes 156 and 157 with the result that a direct current error signal proportional to the shift in phase between the 60 C. P. S. voltages appearing respectively at 148 and 154 appears at 158. This error signal is applied to the reactance tube 159 which is connected as by conductor 160 to the tank circuit 82, Fig. *5a*, and the resultant change in reactance of the tank circuit is sufficient to bring the 60 C. P. S. voltages back into phase, the circuitry of Figs. *5a*, *5b*, and *5c*, in effect, being an electronic servo system as well as a synchronization generator.

Wave form 11 on conductor 35 which it will be recalled is supplied to 4-phase generator 36, Figs. 1, *5a*, and 6, is amplified by tube 161 and appears as wave form 37 at the output of cathode follower tube 162, this being the basic 15,360 C. P. S. sine wave, zero phase shift, referred to in Fig. 2, the zero phase shift being indicated by the vector 163. This sine wave is shifted in phase 45° lagging, as indicated by the vector 164 by the LC network generally designated 165. Similarly, sine wave 37 is shifted in phase 45° leading, as indicated by the vector 166, by the RC network generally designated 167.

The phase of the sine wave corresponding to vector 164 is shifted by way of the tube 168 and transformer 169 with the result that vector sinewave 164 at 315° phase shift appears on conductor 170 and the vector sinewave 171 at 135° phase shift appears on conductor 172. Similarly, the phase of the vector sinewave 166 is shifted by way of tube 173 and transformer 174 with the result that sinewave 166 at 45° phase shift appears on conductor 175 and the vector sinewave 176 at 225° phase shift appears on conductor 177.

The phase shifted voltages thus provided on conductors 175, 172, 177, and 170 are applied to the winding 42 of the phase shift potentiometer for the 15,360 C. P. S. pulse formation circuit 68, Figs. 2 and 8. The shifted sinewave 64 at 15,360 C. P. S., Figs. 2 and 8, appearing on conductor 178 and having a phase shift corresponding to the depicted position of wiper 41 connected thereto, is converted to the square wave 66, Figs. 2 and 8, at 15,360 P. P. S. by the 3 stages of amplification comprising tubes 180, 181, and 182 which, in addition to the amplification, performs squaring and limiting operations on the sinewave at 64.

Wave form 141 on conductor 32 which, it will be recalled is supplied to 4-phase generator 33, Figs. 1, *5b* and 7 is converted to the sine wave form 183 by tubes 184 and 185 and their associated LC filter networks 186 and 187 respectively. Following two stages of amplification by tubes 188 and 189, sine wave form 34, appears at the outputs of cathode follower tubes 190 and 191, this being the basic 30 C. P. S. sine wave, zero phase shift, referred to in Fig. 2, the zero phase shift being indicated by the vector 192. The RC circuit generally designated 193 shifts this sine wave 45° leading, as indicated by the vector 194, and the LC circuit generally designated 195 shifts sine wave 34 45° lagging, as indicated by the vector 196.

The sine wave corresponding to vector 194 is amplified by tubes 197 and 198 and then applied to phase inverter tube 199 from the plate and cathode of which sine waves at 45° and 235° phase shifts respectively are obtained, these appearing on conductors 200 and 201 at the outputs of cathode follower tubes 202 and 203 respectively and indicated by the vectors 204 and 205. Similarly, the sine wave corresponding to vector 196 is amplified by tube 206 and applied to phase inverter tube 207 from the plate and cathode of which sine waves at 135° and 315° phase shifts respectively are obtained, these appearing on conductors 208 and 209 at the outputs of cathode follower tubes 210 and 211 respectively and indicated by the vectors 212 and 213.

The phase shifted voltages thus provided on conductors 200, 201, 208, and 209 are applied to the winding 42 of the phase shift potentiometer for the 30 C. P. S. pulse formation circuit 69, Figs. 1 and 8. The shifted wave 65 at 30 C. P. S., Figs. 2 and 8, appearing on conductor 214 and having a phase shift corresponding to the depicted position of wiper 41 connected thereto is converted to a square wave at 30 C. P. S. by the regenerative amplifier comprising tubes 215 and 216.

The 15,360 P. P. S. wave form 94, Figs. 5*a* and 8, on conductor 97 is supplied via condensers 219 and 223 to regenerative amplifier 215, 216 with the result that the square wave output at 30 C. P. S. is quantized, i. e., is divided into increments of 1/15,360 seconds as indicated by wave form 217. Shifts in phase of wave form 65, as a result of the quantizing, and due to changes in position of wiper 41 thus produce incremental shifts in waveform 217.

The quantized wave form 217 is differentiated by the RC circuit 218, 223 to produce the wave form 220 which comprises positive and negative pulses corresponding to the rise and fall of the square wave at 30 C. P. S. Wave form 220 is thus applied to the grid of the second tube of the multivibrator comprising tubes 221 and 222 and the multivibrator thus is synchronized with wave form 217 by the first negative pulse of wave form 220 to render tube 222 non-conducting and thus produce the rise in square wave or line gating pulse 67, Figs. 2 and 8, which appears at the plate of tube 222.

Pulse 67 is given a width equal to one line period of the raster scan by application of the 15,360 P. P. S. wave form 94, Figs. 5*a* and 8, to the brid of tube 222 by way of conductor 97 and condenser 219 whereby the next positive pulse of wave form 94 flips tube 222 back on, i. e., renders it again conducting. One horizontal line of the raster scan is thus rendered "open" or made subject to intensification as a function of a mechanical shaft position corresponding to a *"y"* coordinate value as indicated by pulse 67.

Pulse 67 is applied via cathode follower tube 224 and condenser 225 to the coincidence circuit 70, Figs. 4 and 8, where it is combined with pulse 66 to form the combined output or coincidence pulse wave form 71, Figs. 2 and 8, and applied to the grid of tube 226. Tube 226 operates to remove or clip the pedestal portion of wave form 71 with the resulting output pulse 72 appearing on conductor 73, the leading edge of pulse 72 being indicative of the target position.

Output pulse 72, which is several microseconds wide, is applied via conductor 73 to the fast pulse shaping network 74, Figs. 1 and 9 where it is progressively sharpened and narrowed by the multivibrator generally designated 228 and the shock excited vibrator generally designated 229 and increased in amplitude by the tuned LC circuit 230, 231 with the resulting pulse 232 appearing on the grid of amplifier tube 233. A germanium diode 234 is employed to prevent the grid of tube 233 from swinging positive, the tube thus being effective to further amplify pulse 232 such that a sharp pulse 235 of approximately ¼ microsecond width appears on conductor 236, Figs. 1 and 9, at the output of cathode follower tube 237. Sharp pulse 235 is the pulse which, as hereinbefore mentioned, produces momentary intensification of the beam 30 of the cathode ray tube 19.

*Operation*

From the foregoing, the details of operation of the display system should be clearly apparent. However, the following example illustrative of the usefulness of the present invention is given to point out the broader operational aspects thereof.

Assume, by way of example, that fixed data pertaining to a map is supplied by way of conductor 79, Fig. 1, such that the map is reproduced on the face 31 of cathode ray tube 19. Assume further that the pairs of shafts 43 of phase shift delay units A, B and C are linked to a radar data gathering source such that each pair of shafts is positioned in accordance with *"x"* and *"y"* coordinate data corresponding to the instantaneous position of an aircraft flying in the vicinity of the land area covered by the map, there thus being three aircraft at different points in the area in the assumed example.

The positions of the shafts of each pair, by means of the circuitry of Figs. 5 to 9, produce the pulses 66 and 67 corresponding to the *"x"* and *"y"* coordinates of the aircraft individual thereto and, when these pulses are in coincidence, produce a beam intensification pulse 235, there being three such pulses for the three aircraft and for each instantaneous position thereof. These pulses produce spots on the face of the cathode ray tube and thus indicate the positions of the aircraft, in the display area, these spot positions becoming traces of the paths of travel of the aircraft upon continued observation.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A device for displaying coordinate data points comprising a cathode ray tube having an indicating beam, means for successively moving said beam over a series of parallel lines in which the *n*th line corresponds to one coordinate and the distance of the beam along the *n*th line corresponds to the other coordinate of a data point to be displayed, means for generating a first short pulse as the beam moves along each line through a position corresponding to said distance along the *n*th line, means for initiating a second pulse of line width at the time of initiation of the movement of the beam in the *n*th line, means for combining said first and second pulses when the same are in coincidence to generate a coincidence pulse, and means for intensity modulating said beam momentarily under control of said coincidence pulse.

2. An apparatus for displaying a plurality of coordinate data points in relation to background information pertinent thereto comprising a cathode ray tube having an electron beam, means for moving said beam relative to the tube screen repetitively over a field of parallel lines generated from harmonically related line and field controlling time bases, means for generating short pulses respectively delayed in time from the initiation of each of said lines in proportion to one of the coordinates of said plurality of coordinate data points, means for generating line pulses having a pulse width equal to and coinciding with the width of said lines, means for respectively delaying said line pulses in time from the initiation of each field of the lines in proportion to the other one of the coordinates of said plurality of coordinate data points, means for combining said short pulses and said line pulses when the same are in coincidence to generate coincidence signals, means for intensity modulating said beam under control of said coincidence signals whereby spots of the beam appear on the screen in positions thereon corresponding respectively to said plurality of coordinate data points, and means for intensity modulating the beam from position to position thereof along said lines in accordance with light variations received from a scene depicting said background information whereby said spots appear in relation to the appearance of said scene on the screen.

3. A system for displaying a coordinate data point on a single display surface comprising a cathode ray tube, means for deriving harmonically related line and field triggering pulses, means controlled by said pulses for moving the cathode ray of said tube over a raster scan, means for phase shifting the line and field triggering pulses respectively in proportion to the coordinate values of said data point, means for quantizing, differentiating and limiting the width of the time delayed field triggering pulse by the line triggering pulse whereby the time delayed field triggering pulse appears in coincidence with one of the lines of the raster scan and has a width equal to the length thereof, combining the last named pulse with the time delayed line triggering pulse when the same are in coincidence, and means under control of the combined pulse for intensity modulating said ray.

4. Apparatus for the display of coordinate data points on a single display surface comprising a cathode ray tube having an indicating beam, means for moving said beam repetitively in a raster scan comprising a plurality of parallel lines, means for generating a short pulse delayed in time from the initiation of movement of the beam in each of said lines in proportion to one of the coordinate values of a data point to be displayed, means for generating a line width pulse coincidental with the one of said lines which is delayed in time from the initiation of each scan by an amount proportional to the other coordinate value of said data point to be displayed, means for combining said short pulse and said line width pulse when the same are in coincidence, and means controlled by said combined pulse for momentarily intensity modulating said beam during each said scan thereof.

5. Apparatus for the display of coordinate data points on a single display surface comprising a cathode ray tube having an indicating beam, a generator of harmonically related *x* and *y* triggering pulses, means controlled by said *x* and *y* pulses for moving said beam repetitively in a raster scan comprising a plurality of lines, means for shifting the phase of the *x* triggering pulse by an amount proportional to the X coordinate of a data point to be displayed, means for shifting the phase of the *y* triggering pulse by an amount corresponding to the Y coordinate of the data point to be displayed, means for combining the phase shifted pulses when the same are in phase coincidence, and means controlled by the combined pulses for momentarily intensity modulating said beam.

6. In a display system of the character disclosed, the combination of a pair of shafts, means for moving said shafts into positions of rotation corresponding respectively to the X and Y coordinates of a data point to be displayed, a cathode ray tube having an indicating beam, a generator of a pair of harmonically related sweep pulses, means controlled by one of said pair of sweep pulses for sweeping said beam in an *x* direction in each of a series of parallel lines, means controlled by the other of said sweep pulses for sweeping said beam in a *y* direction to periodically repeat the sweeping of the beam in said series of lines, means controlled by said shafts for shifting the phase of said sweep pulses in amounts respectively proportional to said X and Y coordinates, means for quantizing one of said pulses by the other, means for combining said phase shifted other pulse with said quantized pulse to generate a coincidence pulse therefrom when the same are in phase coincidence, and means controlled by said coincidence pulse for momentarily intensity modulating said beam.

7. In a display system of the character disclosed, the combination of a pair of shafts, means for moving said shafts into positions of rotation corresponding respectively to the X and Y coordinates of a data point to be displayed, a cathode ray tube display including "*x*" and "*y*" sawtooth generators and deflection amplifiers for sweeping the electron beam of the tube across the screen thereof in a raster scan, a pulse generator for supplying harmonically related triggering pulses for operation of said "*x*" and "*y*" sawtooth generators, means controlled by said shafts for shifting the phase of said triggering pulses in amounts respectively proportional to said X and Y coordinates, means for coinciding one of said pulses with the time of a single beam sweep, means for combining the phase shifted pulses when the same are in phase coincidence thereby to produce a coincidence pulse therefrom, and means controlled by said coincidence pulse for momentarily intensity modulating the electron beam thereby to produce a spot on the screen in a position thereon depicting the X and Y coordinates of said data point.

8. In a display system of the character disclosed, the combination of a cathode ray tube and means for moving the beam thereof in a raster scan relative to the screen of the tube, an oscillator, means for deriving from said oscillator first pulses for controlling the line by line excursions of the beam, frequency divider means for deriving from said first pulses second pulses for controlling the field repetition of the raster scan of the beam, phase detector means for comparing the phase of said second pulses with the phase of a reference frequency source and for generating an error signal for adjustment of the oscillator frequency, means for shifting the phase of said first and second pulses in amounts respectively proportional to the X and Y coordinates of a data point to be displayed on the screen of the tube, means for synchronizing the initiation of said second pulses with the initiation of an excursion, means for combining said phase shifted pulses when the same are in phase coincidence, and means controlled by the combined pulses for momentarily intensity modulating the beam whereby a spot thereof appears on the screen of the tube in a position thereon depicting the coordinates of said data point.

9. In a cathode ray tube display system of the character disclosed, the combination of a cathode ray tube and means for moving the beam of the tube relative to the screen thereof in a raster scan in response to harmonically related *x* and *y* triggering pulses, a synchronization generator including an oscillator for supplying said triggering pulses, a first four phase generator for deriving from said oscillator output a four phase sine wave output at the frequency of said *x* pulses, a second four phase generator for deriving from said *y* pulses a four phase sine wave output at the frequency of the *y* pulses, a pair of potentiometer devices having the outputs of said first and second four phase generators respectively connected thereto whereby the potentiometer devices may be individually adjusted to provide 360 degree phase shifted outputs of the sine waves individual thereto, means for converting phase shifted sine wave outputs of the potentiometer devices to phase shifted pulses at the frequencies of the sine waves respectively individual thereto, means for sharpening the phase shifted pulse at "*x*" frequency, means for quantizing the phase shifted pulse at "*y*" frequency by the *x* pulses, means controlled by the *x* pulses for deriving from the quantized pulse a phase shifted pulse having a width equal to the time between *x* pulses, means for generating a coincidence pulse combining the last named pulse and the sharpened pulse at "x" frequency when the same are in coincidence, fast pulse shaping means for sharpening said coincidence pulse, and means controlled by said sharpened coincidence pulse for intensity modulating said beam thereby to produce a spot on the screen of the tube depicting coordinate values corresponding respectively to the shifts in phase of said sine wave outputs of the potentiometer devices.

10. In a display system of the character disclosed, the combination of a cathode ray tube and sweep means for moving the beam of the tube over the screen thereof in a raster scan in response to $x$ and $y$ pulses, a synchronization generator including a sine wave oscillator operating at the frequency of said $x$ pulses for supplying said $x$ and $y$ pulses, a first four phase generator operable from said oscillator output for generating a four phase sine wave output at "x" frequency, a second four phase generator operable from said $y$ pulses for generating a four phase sine wave output at "y" frequency, a plurality of pairs of potentiometer devices having pairs of shafts positionable in accordance with the X and Y coordinates of a plurality of data points to be displayed on the screen of said tube, each of said devices having a circular winding and a wiper therefor connected to the shaft thereof, said first and second four phase generators having the outputs thereof connected respectively to the windings of each pair of said potentiometer devices whereby the sine wave output of each wiper is shifted in phase up to 360 degrees in accordance with the position thereof on the winding individual thereto, means for converting phase shifted sine wave outputs of the potentiometers to phase shifted square wave pulses at the frequencies of the sine waves individual thereto, means for differentiating the phase shifted square wave pulses at "x" frequency to provide sharp "X" pulses at "x" frequency therefrom respectively shifted in phase relative to said $x$ pulses in accordance with said X coordinates of said plurality of data points to be displayed, means for quantizing the phase shifted square wave pulses at "y" frequency by application thereto of said $x$ pulses thereby to bring the square waves at "y" frequency into synchronism with the $x$ pulses, means for differentiating the quantized square waves at "y" frequency to provide phase shifted sharp pulses at "y" frequency, means triggered by said sharp pulses at "y" frequency and said $x$ pulses for producing "Y" pulses of width equal to the interval between $x$ pulses and having phase shifts relative to the $y$ pulses which are proportional respectively to said Y coordinates of said plurality of data points to be displayed, coincidence circuit means for combining said "X" pulses with said "Y" pulses individual thereto when the same are in coincidence, pulse shaping means for shaping and sharpening said combined pulses, and means controlled by said sharpened combined pulses for intensity modulating said beam whereby spots thereof appear on the screen in positions thereon depicting the coordinates of said data points.

11. Display apparatus according to claim 10 further characterized by the addition of mixer means for combining signals indicative of a scene of background information with said sharpened combined pulses whereby the electron beam is modulated to reproduce said scene on the screen of the tube and to produce said data points in relation thereto.

12. In a device of the class described, a cathode ray tube, means for moving the cathode ray of said tube in a raster scan having a line frequency which is an integral multiple of its frame frequency, means for generating frame pulses at said frame frequency, means for delaying said pulses in accordance with a first variable quantity, means for further delaying said pulses to effect initiation thereof in coincidence with the commencement of a line scan of said ray, and means responsive to said further delayed pulses for intensity modulating said ray.

13. The device of claim 12 including means for limiting the duration of said last mentioned pulses to a time equal to said line frequency.

14. The device of claim 13 including means for generating line pulses at said line frequency and means for delaying said line pulses in accordance with a second variable quantity, said means for further delaying and said means for limiting said frame pulses comprising means controlled by said line pulses.

References Cited in the file of this patent

UNITED STATES PATENTS

| | | |
|---|---|---|
| 2,110,746 | Tolson | Mar. 8, 1938 |
| 2,525,893 | Gloess | Oct. 17, 1950 |
| 2,528,202 | Wolff | Oct. 31, 1950 |
| 2,584,599 | Luck | Feb. 5, 1952 |
| 2,586,605 | Blumlein | Feb. 19, 1952 |
| 2,621,246 | Clayden et al. | Dec. 9, 1952 |
| 2,677,199 | Droz | May 4, 1954 |
| 2,688,126 | Weller | Aug. 31, 1954 |

OTHER REFERENCES

Dummer: Aids to Training etc., Proc. I. E. E. (London), Part III, March 1949, pp. 101 to 112.